(12) United States Patent
Nishida et al.

(10) Patent No.: US 6,597,541 B2
(45) Date of Patent: Jul. 22, 2003

(54) SUSPENSION FOR DISC DRIVE

(75) Inventors: Tatsuhiko Nishida, Aiko-gun (JP); Toshiki Ando, Aiko-gun (JP); Masao Hanya, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 42 days.

(21) Appl. No.: 09/817,552

(22) Filed: Mar. 26, 2001

(65) Prior Publication Data

US 2002/0075606 A1 Jun. 20, 2002

(30) Foreign Application Priority Data

Dec. 15, 2000 (JP) ........................................ 2000-382551

(51) Int. Cl.[7] .............................................. G11B 21/24
(52) U.S. Cl. ................... 360/294.4; 360/294.6
(58) Field of Search ............................. 360/245–245.9; 369/294–294.9

(56) References Cited

U.S. PATENT DOCUMENTS

| | | | | |
|---|---|---|---|---|
| 4,374,402 A | * | 2/1983 | Blessom et al. | 360/294.4 |
| 4,991,045 A | | 2/1991 | Oberg | |
| 5,408,376 A | * | 4/1995 | Nishikura et al. | 360/109 |
| 5,877,919 A | * | 3/1999 | Foisy et al. | 360/294.4 |
| 6,108,175 A | * | 8/2000 | Hawwa et al. | 360/294.4 |
| 6,157,522 A | * | 12/2000 | Murphy et al. | 360/294.6 |
| 6,188,548 B1 | * | 2/2001 | Khan et al. | 360/294.4 |
| 6,201,668 B1 | * | 3/2001 | Murphy | 360/294.4 |
| 6,268,983 B1 | * | 7/2001 | Imada et al. | 360/294.3 |
| 6,297,936 B1 | * | 10/2001 | Kant et al. | 360/294.4 |
| 6,310,750 B1 | * | 10/2001 | Hawwa et al. | 360/294.6 |
| 6,331,923 B1 | * | 12/2001 | Mei | 360/294.4 |
| 6,335,848 B1 | * | 1/2002 | Mei | 360/294.4 |
| 6,404,600 B1 | * | 6/2002 | Hawwa et al. | 360/294.4 |
| 6,421,211 B1 | * | 7/2002 | Hawwa et al. | 360/294.4 |

FOREIGN PATENT DOCUMENTS

JP     60-127578     7/1985

OTHER PUBLICATIONS

M. Hanya et al, "Suspension Design for Windage and High Bandwidth", (Treatise), Presented on Mar.27, 2000, Japan.

* cited by examiner

Primary Examiner—Allen Cao
(74) Attorney, Agent, or Firm—Frishauf, Holtz, Goodman & Chick, P.C.

(57) ABSTRACT

A suspension for disc drive comprises a load beam fitted with a flexure, an actuator base including a base plate, a hinge member thinner than the base plate, and a pair of piezoelectric ceramic elements. Each piezoelectric ceramic element is stored in an opening portion in the actuator base and fixed to the actuator base by an adhesive layer. The adhesive layer includes an electrical insulating adhesive agent and a large number of fillers of an insulating material mixed in the adhesive agent. The fillers are interposed between each piezoelectric ceramic element and the actuator base to secure a clearance for electrical insulation between the two.

16 Claims, 5 Drawing Sheets

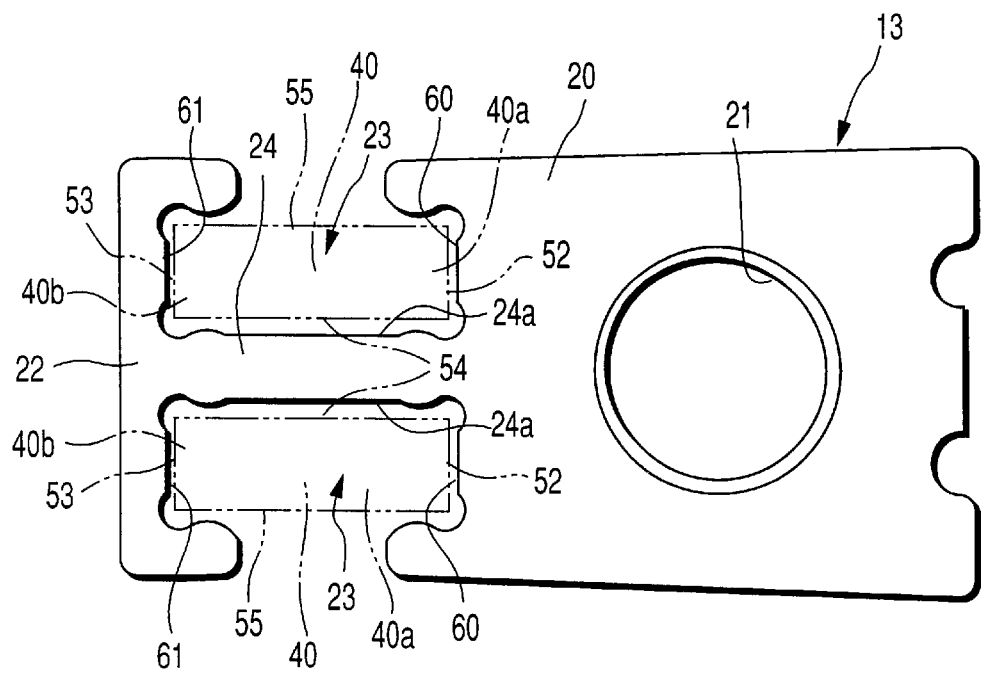
F I G. 2
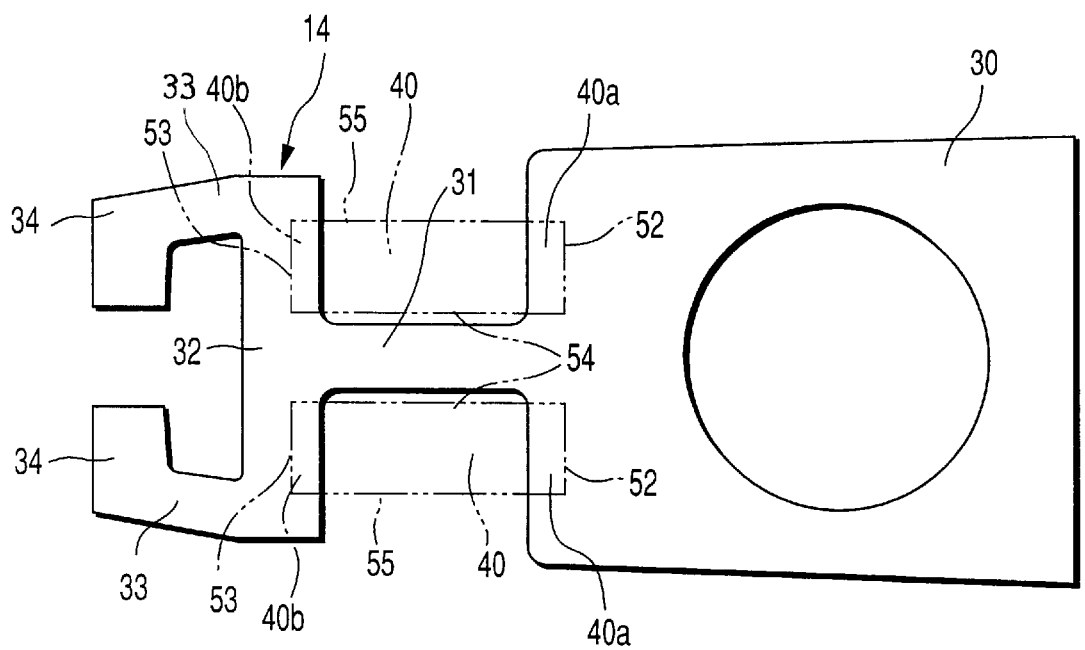
F I G. 3

SUSPENSION FOR DISC DRIVE

CROSS-REFERENCE TO RELATED APPLICATIONS

This application is based upon and claims the benefit of priority from the prior Japanese Patent Application No. 2000-382551, filed Dec. 15, 2000, the entire contents of which are incorporated herein by reference.

BACKGROUND OF THE INVENTION

The present invention relates to a suspension for disc drive incorporated in an information processing apparatus, such as a personal computer.

In a disc drive that is provided with a rotating magnetic disc or magneto-optical disc, a magnetic head is used to record on or read data from a recording surface of the disc. The magnetic head includes a slider opposed to the recording surface of the disc, a transducer stored in slider, etc. When the disc rotates at high speed, the slider slightly lifts off the disc, whereupon an air bearing is formed between the disc and the slider. A suspension for holding the magnetic head comprises a beam member called a load beam, a flexure formed of a very thin plate spring fixed to the load beam, a base plate provided on the proximal portion of the load beam, etc. The slider that constitutes the magnetic head is mounted on the distal end portion of the flexure.

In a hard disc drive (HDD), the track center of the disc must be subjected to following control within ±10% of the track width. With the recent development of higher-density discs, the track width has been being reduced to 1 μm or less, and it is hard to keep the slider in the track center. It is necessary, therefore, to carry out accurate position control of the slider as well as to increase the stiffness of the disc, thereby reducing the oscillation of the disc.

In general, conventional disc drives are of a single-actuator type such that a suspension is moved by means of a voice coil motor only. The single-actuator suspension has many peaks of resonance in low-frequency bands. Thus, it is hard to control a slider (head portion) on the distal end of the suspension in high-frequency bands by means of the voice coil motor only, and the bandwidth of a servo cannot be enhanced.

Accordingly, a dual-actuator suspension has been developed including a micro-actuator portion as well as a voice coil motor. The micro-actuator portion causes a second actuator slightly to move the distal end portion of a load beam or a slider in the transverse direction of the suspension (so-called sway direction).

Since the movable portion that is driven by means of the second actuator is considerably lighter in weight than a movable portion of the single-actuator suspension, the slider can be controlled in high-frequency bands. Thus, the dual-actuator suspension, compared with the single-actuator suspension, can make the bandwidth of a servo for the position control of the slider several times higher, and track misses can be reduced correspondingly.

It is known that a piezoelectric ceramic element, such as lead zirconate-titanate (solid solution of $PbZrO_3$ and $PbTiO_3$) called PZT, can be suitably used as the material of the second actuator. Since PZT has a considerably high resonance frequency, it is suited for the second actuator that is used in the dual-actuator suspension. This piezoelectric ceramic element is fixed to an actuator base with an adhesive agent.

The piezoelectric ceramic element, e.g., PZT, used in the micro-actuator portion is as thin as tens to hundreds of micrometers and fragile. Electrodes for current supply to the piezoelectric ceramic element are formed on the obverse or reverse side of the element. On the other hand, the metal base plate and the like that constitute the actuator base are used as electrical grounds. In order to prevent a short circuit between the electrodes of the piezoelectric ceramic element and the actuator base, therefore, a clearance for electrical insulation must be secured between the electrodes and the actuator base. In general, this clearance is believed to be able to be secured by curing the adhesive agent in a manner such that the piezoelectric ceramic element and the actuator base are clamped in position by means of a jig.

If the piezoelectric ceramic element is clamped by means of the jig, however, it may be broken by stress, in some cases, since the adhesive agent slightly contracts as it cures. If the piezoelectric ceramic element is not broken in an adhesive bonding process, it may possibly be broken by the residual stress when it is subjected to external force in a bonding process or the like afterward.

BRIEF SUMMARY OF THE INVENTION

Accordingly, the object of the present invention is to provide a suspension for disc drive designed so that piezoelectric ceramic elements can be securely insulated from an actuator base without being broken.

In order to achieve the above object, a suspension of the present invention comprises a load beam provided with a flexure, an actuator base provided on the proximal portion of the load beam, a piezoelectric ceramic element mounted on the actuator base and adapted to be distorted to displace the load beam in a sway direction when voltage is applied thereto, and an adhesive layer for fixing the piezoelectric ceramic element to the actuator base, the adhesive layer including an electrical insulating adhesive agent and a plurality of fillers of an electrical insulating material mixed in the adhesive agent and having a size such that a clearance for electrical insulation can be secured between the piezoelectric ceramic element and the actuator base. The fillers may suitably be formed of a material that has electrical insulating properties and cannot be easily deformed by compressive load, e.g., particles of silicon dioxide.

According to this invention, an appropriate clearance for electrical insulation can be easily secured between a conductive portion, such as an electrode, of the piezoelectric ceramic element and the actuator base. In this case, the adhesive agent can be cured by means of a jig without clamping the piezoelectric ceramic element, so that generation of stress can be avoided, and the piezoelectric ceramic element can be prevented from being broken.

In the suspension of the present invention, the actuator base may be formed having an opening portion capable of holding the piezoelectric ceramic element, the opening portion holding the piezoelectric ceramic element. Since the piezoelectric ceramic element is held in the opening portion of the actuator base, according to this invention, it can be protected, and a micro-actuator portion can be thinned. Since the deviation of the thickness-direction center of the piezoelectric ceramic element from that of a base plate is small, moreover, the displacement of the piezoelectric ceramic element can be transmitted effectively in the sway direction.

In the suspension of the invention, moreover, the piezoelectric ceramic element may be formed having different-polarity electrodes (first and second electrodes) individually on the obverse and reverse sides thereof. In the micro-actuator portion designed so that the first electrode of the piezoelectric ceramic element is grounded on the actuator base and a wire is bonded to the second electrode, according to this invention, an appropriate clearance for electrical insulation can be secured between the second electrode and the actuator base.

In the suspension of the invention, the recommended particle size of the fillers is 10 µm or more, and preferably 30 µm or more. According to this invention, good electrical insulating properties can be secured at high voltage, not to mention voltage that is applied to conventional piezoelectric ceramic elements.

Preferably, the Young's modulus of the adhesive agent in a cured state is 60 MPa or more. Since the Young's modulus of the adhesive agent is 60 MPa or more, according to this invention, the stroke of the piezoelectric ceramic element can be kept at a practically reasonable level. In this case, the Young's modulus of the adhesive layer can be further improved if fillers with a Young's modulus higher than that of the adhesive agent are mixed into the adhesive agent.

In the suspension of the invention, the load beam and the actuator base may be connected to each other by means of an independent flexible hinge member. According to this invention, materials that meet required properties of the load beam, actuator base, and hinge member can be used, so that the properties of the suspension can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a plan view of a base plate of the suspension shown in FIG. 1;

FIG. 3 is a plan view of a hinge member of the suspension shown in FIG. 1;

DETAILED DESCRIPTION OF THE INVENTION

A suspension 10A for disc drive according to a first embodiment of the present invention will now be described with reference to FIGS. 1 to 5.

Figure 1:
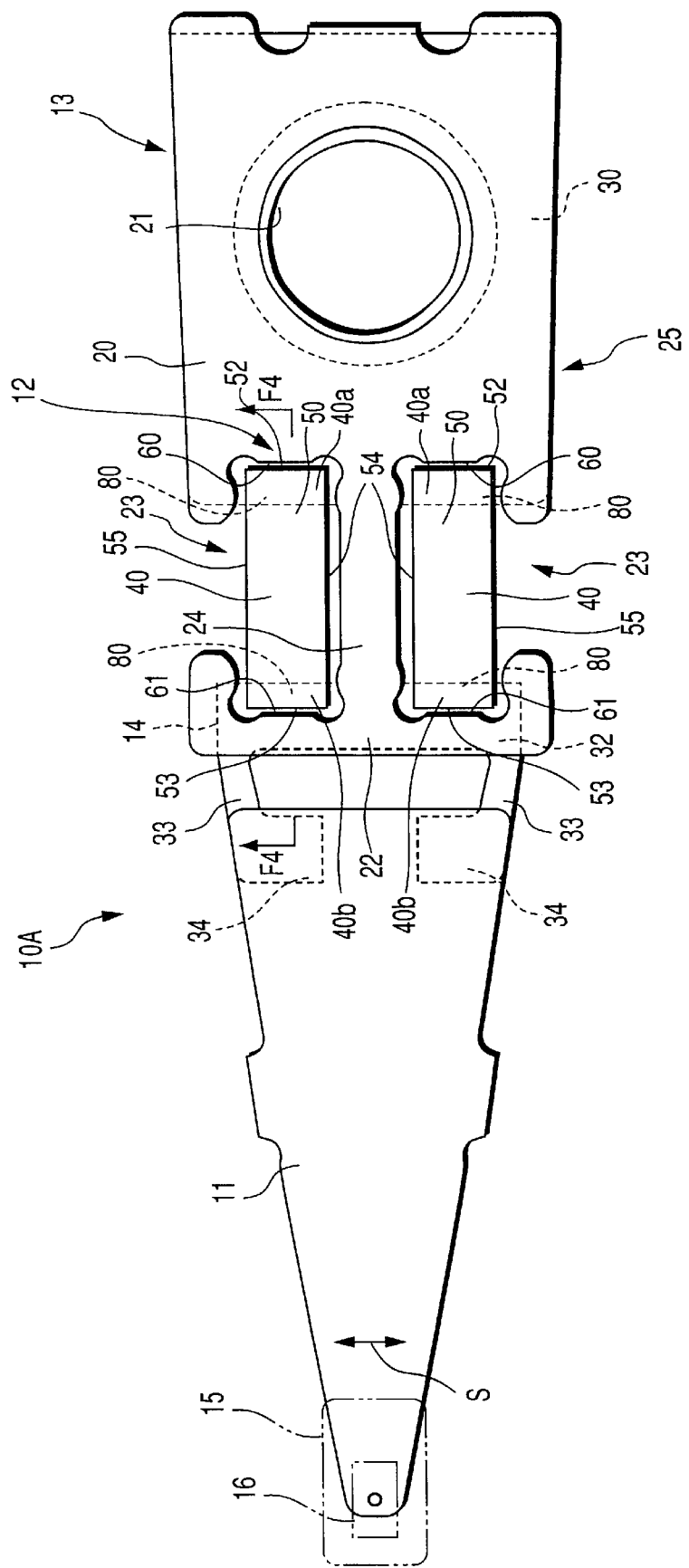
FIG. 1 is a plan view of a suspension according to a first embodiment of the present invention.

The suspension 10A of a dual-actuator type shown in FIG. 1 comprises a load beam 11, micro-actuator portion 12, base plate 13, hinge member 14, etc. The load beam 11 is formed of a springy metal plate with a thickness of, e.g., about 100 µm. A flexure 15 is mounted on the load beam 11. The flexure 15 is formed of a thin, metal precision plate spring that is thinner than the load beam 11. A slider 16 that constitutes a magnetic head is provided on the distal end portion of the flexure 15.

As shown in FIG. 2, a circular boss hole 21 is formed in a proximal portion 20 of the base plate 13. A pair of opening portions 23 are formed between the proximal portion 20 and a front end portion 22 of the base plate 13. Each opening portion 23 is large enough to hold a piezoelectric ceramic element 40. A strip-shaped connecting portion 24 extends in the longitudinal direction of the base plate 13 (axial direction of the suspension 10A) between the paired opening portions 23. The connecting portion 24 can bend to a certain degree in the transverse direction of the base plate 13 (sway direction indicated by arrow S in FIG. 1).

The proximal portion 20 of the base plate 13 is fixed to the distal end portion of an actuator arm that is driven by means of a voice coil motor (not shown), and is turned by means of the voice coil motor. The base plate 13 is formed of a metal plate with a thickness of, e.g., about 200 µm. In the case of this embodiment, the base plate 13 and the hinge member 14 constitute an actuator base 25 according to the present invention.

As shown in FIG. 3, the hinge member 14 includes a proximal portion 30 fixedly superposed on the proximal portion 20 of the base plate 13, a strip-shaped bridge portion 31 formed corresponding in position to the connecting portion 24 of the base plate 13, intermediate portion 32 formed corresponding in position to the front end portion 22 of the base plate 13, a pair of flexible hinge portions 33 capable of elastic deformation in the thickness direction, a distal end portion 34 fixed to the load beam 11, etc. The hinge member 14 is formed of a springy metal plate with a thickness of, e.g., about 50 µm.

The micro-actuator portion 12 includes a pair of piezoelectric ceramic elements 40, platelike piezoelectric elements such as PZTs. Each rectangular piezoelectric ceramic element 40 has obverse and reverse sides 50 and 51 (shown in FIG. 4) in the thickness direction, end faces 52 and 53 at the opposite ends in the longitudinal direction, and opposite side faces 54 and 55.

The piezoelectric ceramic elements 40 are stored individually in the opening portions 23 of the actuator base 25 so as to extend substantially parallel to each other. When each element 40 is fitted in its corresponding opening portion 23, its opposite end faces 52 and 53 face inner surfaces 60 and 61, respectively, at the longitudinally opposite ends of the opening portion 23 across clearances between the end faces and the inner surfaces. The side face 54 of each element 40 nearer to the connecting portion 24, out of the opposite side faces 54 and 55, faces a side face 24a of the connecting portion 24 across a clearance between them.

Figure 4:
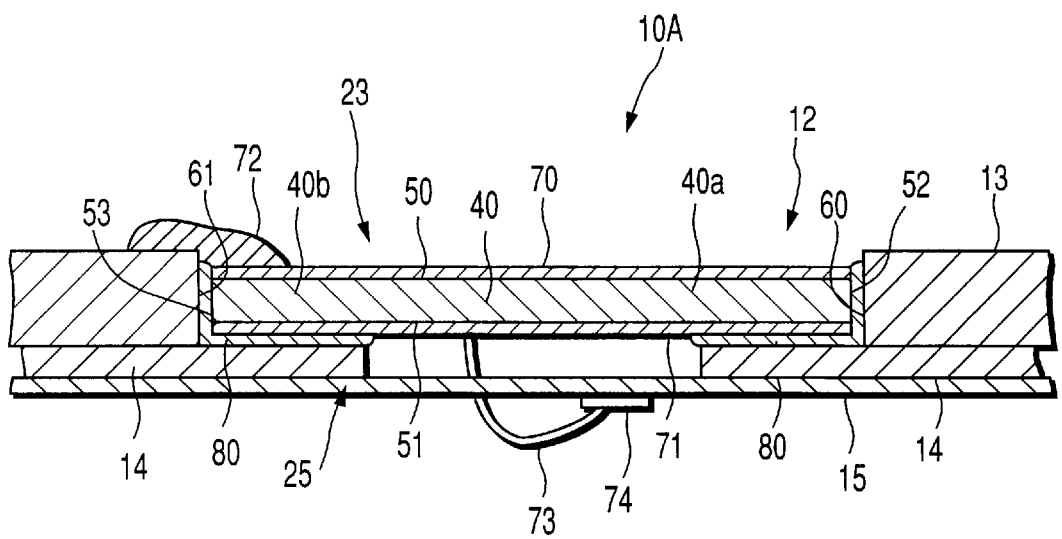
FIG. 4 is a sectional view of a micro-actuator portion of the suspension taken along line F4—F4 of FIG. 1.

As shown in FIG. 4, electrodes 70 and 71 of a conductive material such as metal are formed on the obverse and reverse sides 50 and 51, respectively, of each piezoelectric ceramic element 40 by sputtering or plating. The one electrode 70 is grounded on the base plate 13 with silver paste 72. A wire 73 is connected to the other electrode 71. The wire 73 is bonded to a terminal 74 of a wiring member on the flexure 15.

One end portion 40a of each piezoelectric ceramic element 40 is fixed to the proximal portion 30 of the hinge member 14 by means of an adhesive layer 80. The other end portion 40b of the element 40 is fixed to the intermediate portion 32 of the hinge member 14 by means of the adhesive layer 80. As this is done, the adhesive layer 80 must be also loaded into the spaces between the element 40 and the inner surfaces 60 and 61 of each opening portion 23 of the actuator base 25. By doing this, the distortion (displacement) of the piezoelectric ceramic element 40 can be transmitted toward the load beam 11 more effectively, and the end faces 52 and 53 and the side faces 54 and 55 of the element 40 can be securely insulated from the actuator base 25.

When voltage is applied, one of the paired piezoelectric ceramic elements 40 extends in the longitudinal direction, while the other element 40 contracts in the longitudinal direction. Thus, the load beam 11 is displaced for a desired distance in the transverse direction (sway direction) in accordance with the direction of distortion and the stroke of the piezoelectric ceramic elements 40.

Figure 5:
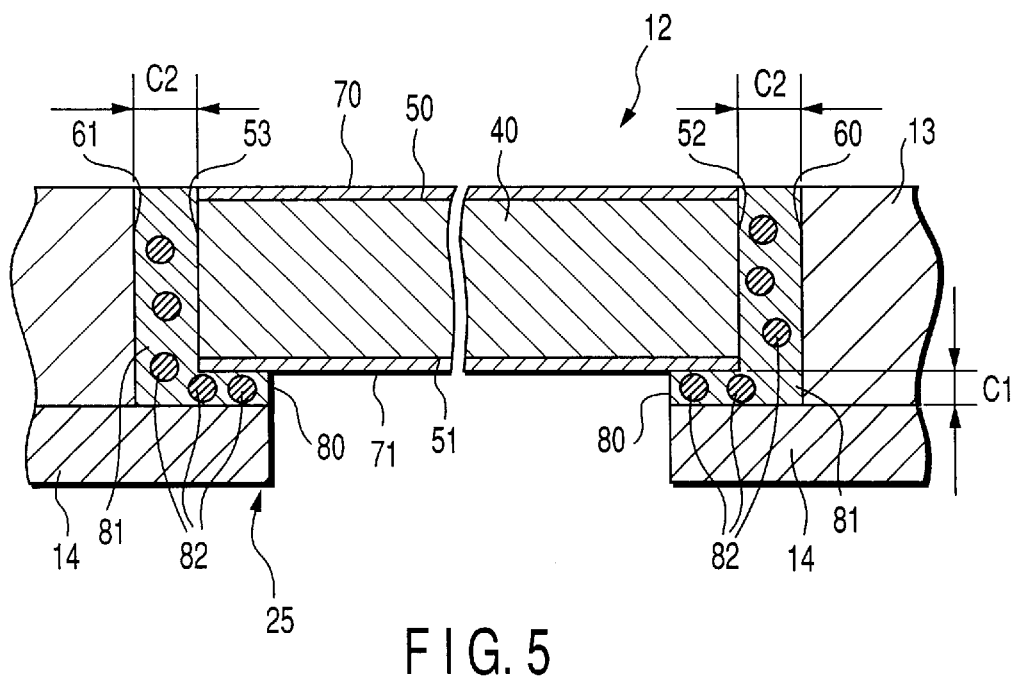
FIG. 5 is an enlarged sectional view showing a part of the micro-actuator portion shown in FIG. 4.

As is schematically shown in FIG. 5, the adhesive layer 80 includes an adhesive agent 81, which serves as an electrical insulating matrix resin, and a large number of grain fillers 82. These grain fillers 82 are formed of an electrical insulating material and contained in the adhesive agent 81. Although an epoxy resin is an example of the adhesive agent 81, any of plastic adhesive agents including acrylic resins may be used for the purpose.

The fillers 82 have a size such that they can be interposed between each piezoelectric ceramic element 40 and the actuator base 25 to secure a clearance for electrical insulation between the two. The particle size of the fillers 82 should be 10 $\mu$m or more, preferably 30 $\mu$m or more. Although the fillers 82 are formed of silica (silicon dioxide), for example, they may be formed of any other materials that have electrical insulating properties and cannot be easily deformed by compressive load, e.g., particles of ceramics, glass, synthetic resin, etc.

With use of the fillers 82 in the adhesive layer 80, a predetermined clearance can be secured between each piezoelectric ceramic element 40 and the actuator base 25 without using any jig. As is schematically shown in FIG. 5, for example, a length of 10 $\mu$m or more is secured for a clearance C1 between the electrode 71 of each ceramic element 40 and the hinge member 14 and clearances C2 between the end faces 52 and 53 of the element 40 and the inner surfaces 60 and 61 of the base plate 13.

In order to examine the electrical insulating properties of the piezoelectric ceramic elements 40 of the suspension 10A, tests were conducted individually for voltages of 100V, 200V, 300V, and 400V. It was confirmed by these tests that electrical insulation can be secured at any of the aforesaid voltages with use of the adhesive layer 80 of the present embodiment.

On the other hand, the same electrical insulation tests for voltages as aforesaid were conducted for the case where each piezoelectric ceramic element 40 was fixed to the actuator base 25 with an adhesive agent that does not include the fillers 82 without using any jig. In this case, some samples lacked in clearance for insulation, and suffered insulation failure at 100 or less than 100V.

Figure 6:
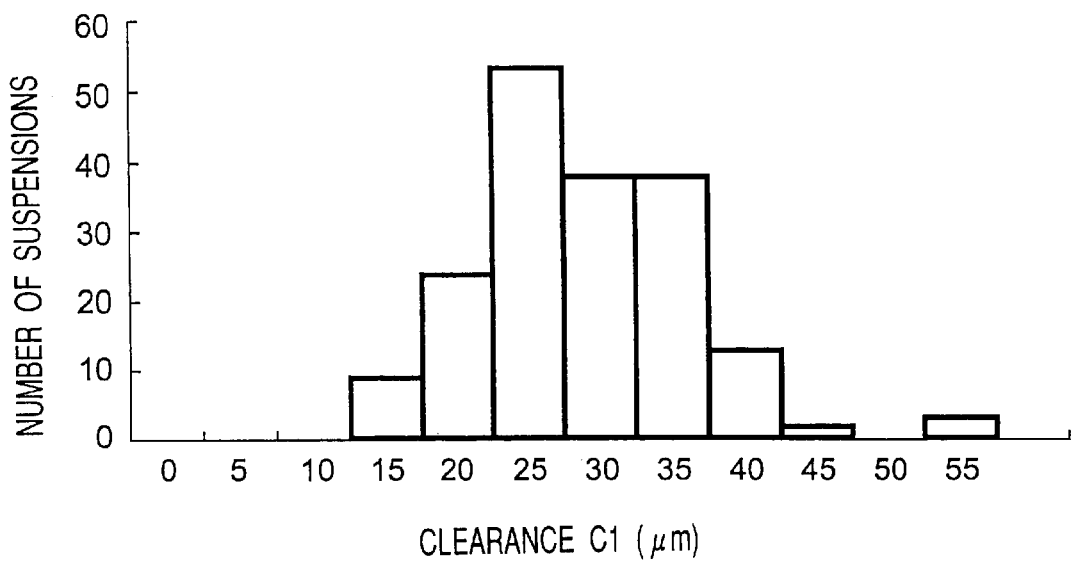
FIG. 6 is a diagram showing the relationship between the clearance between each piezoelectric ceramic element and the hinge member and the number of suspensions that ensure electrical insulation.

The inventors hereof manufactured by way of trial a large number of suspensions in which piezoelectric ceramic elements were fixed to an actuator base with an adhesive agent with fillers. The inventors examined the relationship between the number of those ones of the suspensions which ensured a given level of electrical insulation and the clearance C1 (clearance between each piezoelectric ceramic element 40 and the hinge member 14). FIG. 6 shows the result of the examination.

Figure 7:
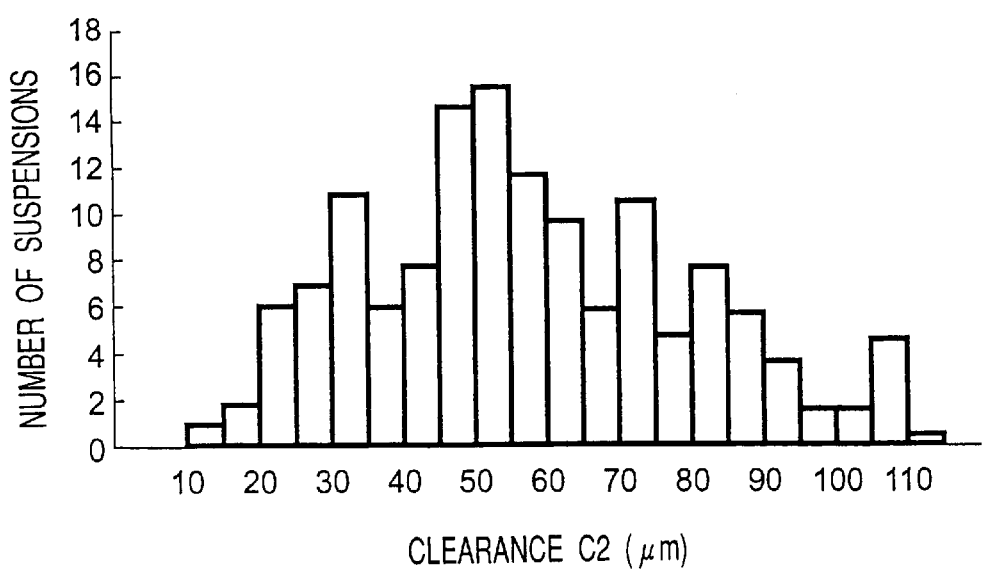
FIG. 7 is a diagram showing the relationship between the clearance between each piezoelectric ceramic element and the base plate and the number of suspensions that ensure electrical insulation.

FIG. 7 shows the result of examination of the relationship between the number of suspensions and each clearance C2 (clearance between each piezoelectric ceramic element 40 and the base plate 13) for the case where each ceramic element 40 was fixed to the actuator base with the adhesive agent with fillers. These insulation tests revealed that a given level of electrical insulation can be ensured if the clearances C1 and C2 are greater than 10 $\mu$m. In other words, the given insulation level can be secured if the fillers 82 of 10 $\mu$m or more are mixed into the adhesive agent 81.

In the foregoing embodiment, the piezoelectric ceramic elements 40 are fixed to the actuator base 25 by means of the adhesive layer 80 that is loaded with the fillers 82 of 10 $\mu$m or more. With use of this adhesive layer 80, an appropriate clearance (about 10 $\mu$m to 50 $\mu$m) can be secured without using any jig. According to this embodiment, generation of stress after the curing of the adhesive agent, which is caused when the piezoelectric ceramic elements are clamped by means of a jig, can be avoided.

The inventors hereof manufactured five samples based on the foregoing embodiment and examined loads that broke the piezoelectric ceramic elements 40 after the adhesive agent had been cured. On the other hand, the inventors prepared five comparative examples in which piezoelectric ceramic elements were clamped by means of a jig as an adhesive agent (without fillers) was cured, and examined loads that broke the ceramic elements.

The destructive tests revealed that Samples 1 to 5 based on the foregoing embodiment were broken under loads of 140 g, 160 g, 130 g, 180 g, and 130 g, individually, so that the average breaking load was 148 g. On the other hand, Comparative Examples 1 to 5 were broken under loads of 90 g, 70 g, 80 g, 40 g, and 80 g, individually, so that the average breaking load was as low as 72 g.

Figure 8:
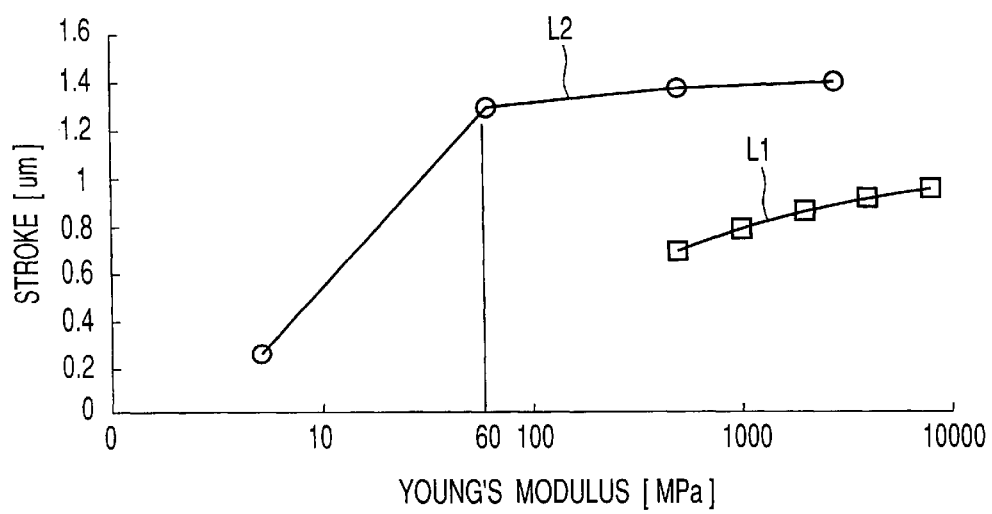
FIG. 8 is a diagram showing the relationship between the Young's modulus of an adhesive agent and the stroke of each piezoelectric ceramic element.

FIG. 8 shows the relationship between the Young's modulus of the adhesive agent and the stroke of the piezoelectric ceramic elements 40. In FIG. 8, L1 and L2 represent an analytic value and a measured value, respectively. The higher the Young's modulus of the adhesive agent 81, as seen from FIG. 8, the more favorably the stroke of the ceramic elements 40 can be secured. A stroke suited for practical use can be secured by using an adhesive agent with the Young's modulus of 60 MPa or more, in particular.

Figure 9:
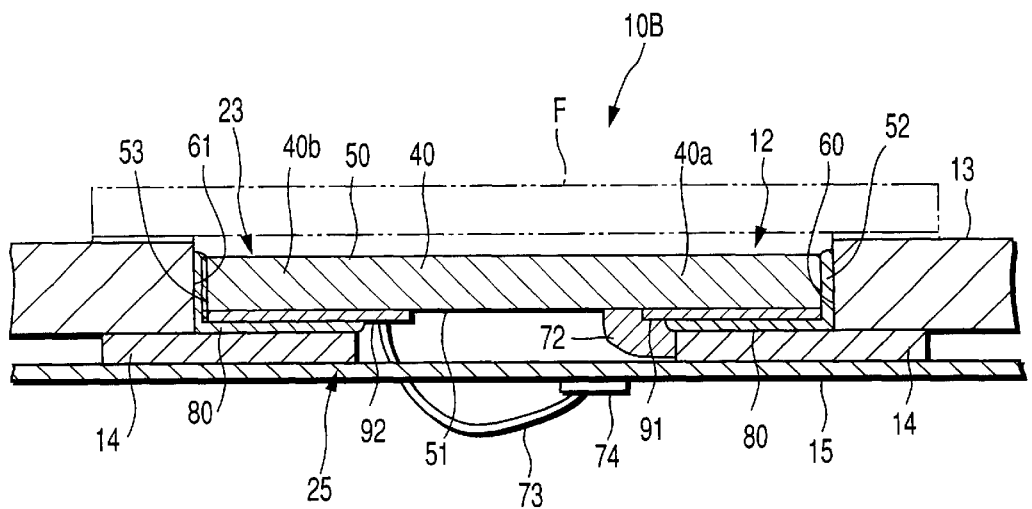
FIG. 9 is a sectional view showing a part of a suspension according to a second embodiment of the invention.

FIG. 9 shows a suspension 10B according to a second embodiment of the invention. In the case of this suspension 10B, a pair of electrodes 91 and 92 are formed on a reverse side 51 of each piezoelectric ceramic element 40, and the first electrode 91 is grounded on a hinge member 14 with silver paste 72. A wire 73 that is connected to the second electrode 92 is bonded to a terminal 74 of a flexure 15. The second embodiment shares other configurations and functions with the suspension 10A of the first embodiment. Therefore, common reference numerals are used to designate common portions of the two embodiments, and a description of those portions is omitted. In the suspension 10B of this embodiment, a clearance for insulation is also secured between the electrode 92 of the piezoelectric ceramic element 40 and the hinge member 14 by means of an adhesive layer 80 that is loaded with fillers.

In each of the foregoing embodiments, the piezoelectric ceramic elements 40 are held individually in the opening portions 23 in the actuator base 25. Instead of holding the elements 40 in the opening portions 23, however, the elements 40 may be fixed to the base plate 13 by means of the adhesive layer 80 in a manner such that they are superposed on the base plate 13, as indicated by two-dot chain line F in FIG. 9.

It is to be understood, in carrying out the present invention including the embodiments described herein, that the components that constitute the invention, including the load beam, actuator base, base plate, adhesive agent, fillers, piezoelectric ceramic elements, etc., may be variously changed or modified without departing from the scope or spirit of the invention. For lighter weight, the base plate and the load beam may be formed of a light metal alloy, such as aluminum alloy, or a laminate (e.g., cladding) of a light metal alloy and stainless steel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive, comprising:
    a load beam;
    a flexure coupled to the load beam;
    an actuator base arranged at a proximal portion of the load beam;
    at least one piezoelectric ceramic element mounted on the actuator base and adapted to be distorted to displace the load beam when voltage is applied thereto; and
    an adhesive layer arranged between the at least one piezoelectric ceramic element and the actuator base for fixing the at least one piezoelectric ceramic element to the actuator base,
    the adhesive layer including an electrical insulating adhesive agent and a plurality of grain fillers of an electrical insulating material mixed in the adhesive agent, the grain fillers having a size such that they are interposed between the at least one piezoelectric ceramic element and the actuator base to secure a clearance for electrical insulation between the at least one piezoelectric ceramic element and the actuator base.

2. A suspension for a disc drive according to claim 1, wherein said actuator base comprises at least one opening portion each capable of holding a respective one of each said at least one piezoelectric ceramic element.

3. A suspension for a disc drive according to claim 2, wherein each said at least one piezoelectric ceramic element is formed having different-polarity electrodes individually on the obverse and reverse sides thereof.

4. A suspension for a disc drive according to claim 1, wherein the particle size of said fillers falls within a range of 10 μm to 50 μm.

5. A suspension for a disc drive according to claim 1, wherein the Young's modulus of said adhesive agent in a cured state falls within a range from 60 MPa to 3000 MPa.

6. A suspension for a disc drive according to claim 2, wherein the Young's modulus of said adhesive agent in a cured state falls within a range from 60 Ma to 3000 MPa.

7. A suspension for a disc drive according to claim 3, wherein the Young's modulus of said adhesive agent in a cured state falls within a range from 60 MPa to 3000 MPa.

8. A suspension for a disc drive according to claim 4, wherein the Young's modulus of said adhesive agent in a cured state falls within a range from 60 MPa to 3000 MPa.

9. A suspension for a disc drive according to claim 1, further comprising a springy hinge member for connecting said load beam and said actuator base to each other.

10. A suspension for a disc drive according to claim 2, further comprising a springy hinge member for connecting said load beam and said actuator base to each other.

11. A suspension for a disc drive according to claim 3, further comprising a springy hinge member for connecting said load beam and said actuator base to each other.

12. A suspension for a disc drive according to claim 4, further comprising a springy hinge member for connecting said load beam and said actuator base to each other.

13. A suspension for a disc drive according to claim 5, further comprising a springy hinge member for connecting said load beam and said actuator base to each other.

14. A suspension for a disc drive according to claim 1, wherein the clearance between the at least one piezoelectric ceramic element and the actuator base is at least as large as the size of the grain fillers.

15. A suspension for a disc drive according to claim 1, wherein the grain fillers are formed of a material which is not easily deformed by a compressive load.

16. A suspension for a disc drive according to claim 1, wherein the grain fillers are formed of silica.

* * * * *